Oct. 25, 1955   F. C. EVANS   2,721,992
COMPENSATOR FOR AERO TUBE SYSTEMS
Filed Aug. 12, 1952   3 Sheets-Sheet 1

INVENTOR.
F. C. EVANS
BY
ATTORNEY

Oct. 25, 1955  F. C. EVANS  2,721,992
COMPENSATOR FOR AERO TUBE SYSTEMS
Filed Aug. 12, 1952  3 Sheets-Sheet 2

INVENTOR.
F. C. EVANS
BY
*M. J. Reynolds*
ATTORNEY

Oct. 25, 1955          F. C. EVANS          2,721,992
COMPENSATOR FOR AERO TUBE SYSTEMS
Filed Aug. 12, 1952          3 Sheets-Sheet 3
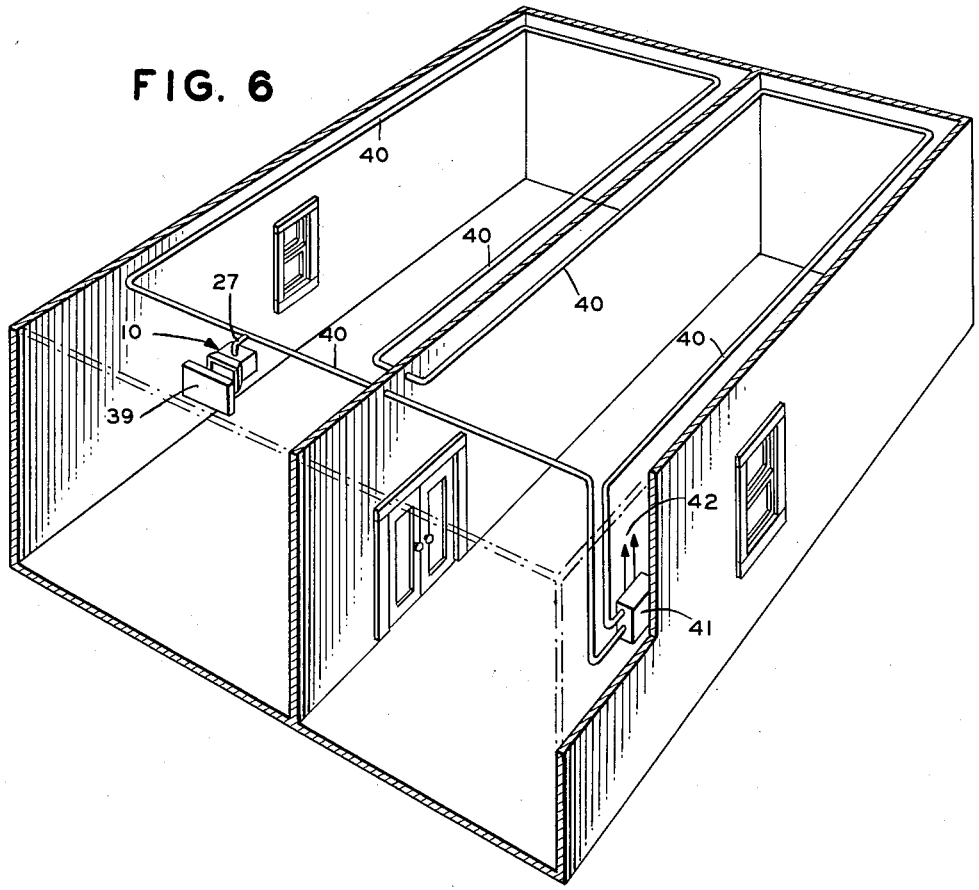
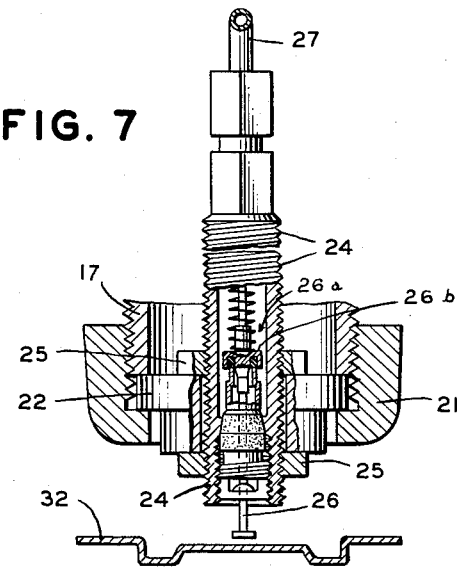
*INVENTOR.*
F. C. EVANS

United States Patent Office 2,721,992
Patented Oct. 25, 1955

2,721,992

COMPENSATOR FOR AERO TUBE SYSTEMS

Francis C. Evans, Richmond, N. Y., assignor to American District Telegraph Company, Jersey City, N. J., a corporation of New Jersey Application August 12, 1952, Serial No. 304,021

9 Claims. (Cl. 340—229)

This invention relates to compensators for fire detection systems and more particularly to blower heater compensators for aero tube detection systems.

When aero tubing is installed in premises to be protected by a fire alarm system associated with the tubing under normal conditions, the air pressure in the tubing rises as the temperature of the premises increases. However, if heating devices, such as blower heaters or the like, are employed oftentimes the air pressure in the tubing will increase very rapidly as the blower begins operation, in fact so rapidly that the bleeding vents in the system cannot permit a sufficient escape of air to prevent the actuation of an alarm.

Accordingly, an object of the present invention is to provide a compensating unit which can be placed in the immediate vicinity of a blower heater or other source of intermittent heat and connected to an aero system in such fashion that the unit automatically permits an escape of air pressure under heating conditions, which escape of air pressure will prevent the actuation of a fire alarm.

Another object of the invention is to provide a unit of such character in which a valve is associated with the aero tubing and is normally closed to prevent leakage of air therefrom, together with a valve actuator operated by the application of heat thereto to open the valve and permit escape of air.

Another object of the invention is to provide an actuator for the valve in the nature of a bellows which will expand upon being heated to impinge upon a valve stem and move the same to open the valve.

A further object of the invention is to provide a bellows in which a vent is provided of such character that increased air pressure within the bellows can be permitted to bleed off during a predetermined time interval.

A still further object of the invention is to provide a bellows vent, as before mentioned, of such character that air can leak into the bellows to prevent the creation of a partial vacuum therein.

Other features, objects and advantages of the invention will become apparent by reference to the following detailed description of the drawings wherein—

Fig. 6 is a schematic perspective view showing an aera tube fire detection system including a compensator of the type shown in Figs. 1–4 to compensate for the effect of a blower heater which is located in a position to affect the system.

Fig. 7 is a sectional view, in the same sectional plane as Fig. 4, showing the arrangement of the valve of the compensator, Fig. 7 being an enlargement of an upper portion of Fig. 4, with more parts shown in section.

Figure 1:
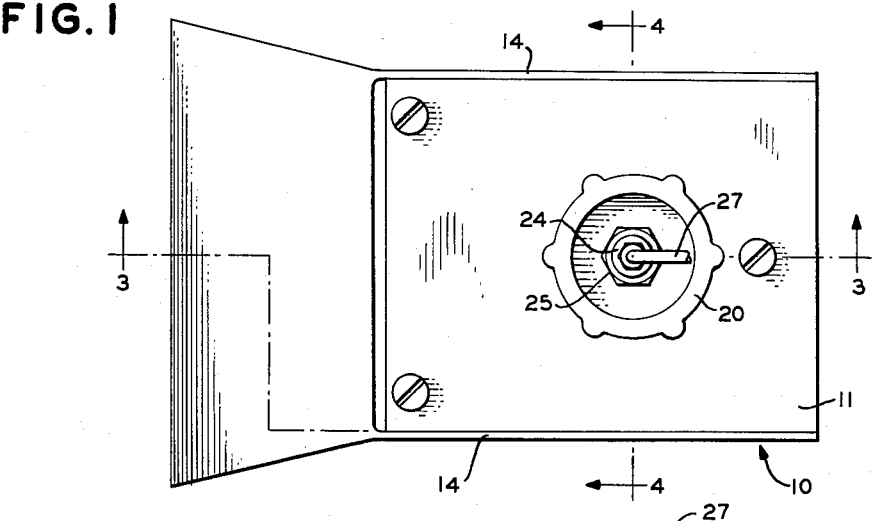
Fig. 1 is a plan view of a unit embodying the invention and showing a fragment of aero tube attached thereto.
Figure 2:
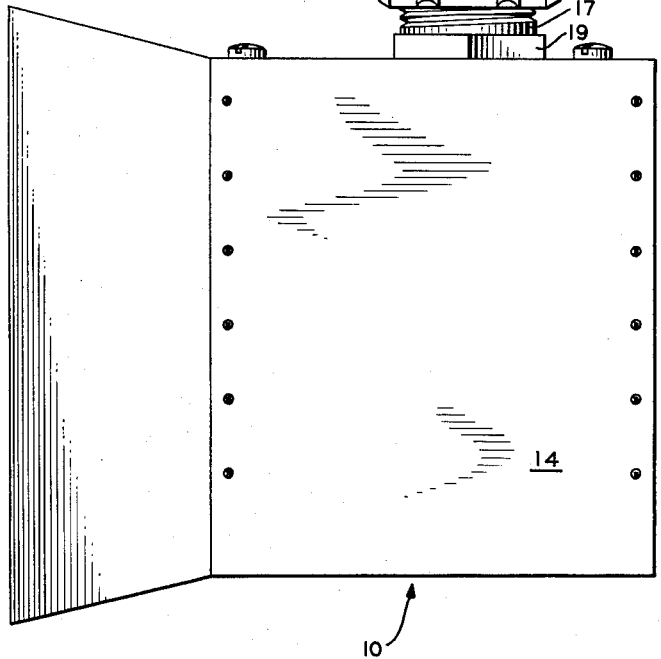
Fig. 2 is a side view of the unit.
Figure 3:
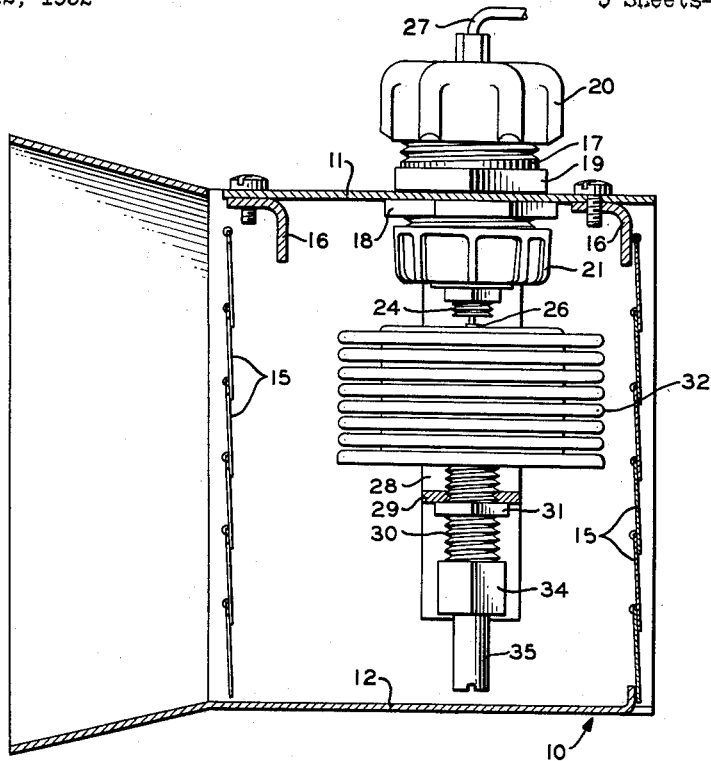
Fig. 3 is a section taken substantially on the line 3—3 of Fig. 1.
Figure 4:
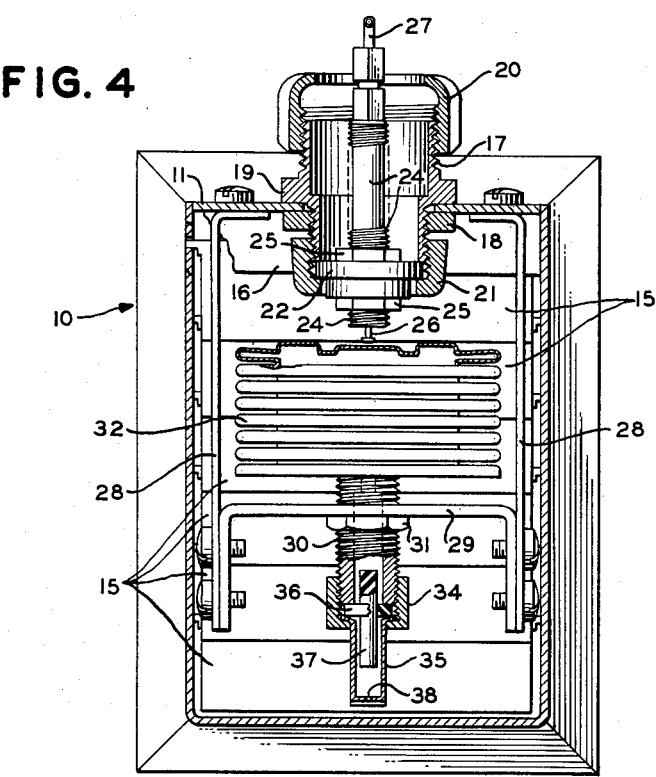
Fig. 4 is a section taken substantially on the line 4—4 of Fig. 1.
Figure 5:
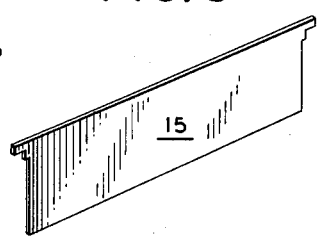
Fig. 5 is a perspective view of a louver member, a number of which are hingedly mounted at opposite edges of the housing.

Referring to the drawings, 10 indicates generally a housing of sheet metal made up of top 11, bottom 12, side walls 14 and extensions of all these ports, flared outwardly to funnel air toward the interior of the housing. Between the side walls are hinged a plurality of swinging louver members 15 both adjacent the flared out part and at the opposite edges of the housing.

The top 11 is removably secured to two angle members 16 which are fastened between side walls 14. Top 11 has an opening therein for the reception of a hollow fixture 17 which is locked in place by a nut 18 bearing against the under surface of top 11 and confining the material of the top between the nut and an integral flange 19 of the fixture. Fixture 17 is externally threaded to receive internally threaded member 20, by which the entire unit may be secured to suitable supports, not shown. A lower internally threaded member 21 engages fitting 17 and serves to retain a stepped disk 22 against the lower end of the fitting. Disk 22 has a through opening for the passing of a valve casing 24 which is held in place by nuts 25. As shown in Fig. 7, the casing 24 houses a valve 26a, the stem 26 of which protrudes beyond the lower end of the casing. This arrangement corresponds in all details with the well known conventional auto tire valve. The stem 26 and a shoulder 26b carried by it are spring-biased downwardly so that the shoulder 26b engages a sleeve beneath it and closes the valve. When the stem 26 is pushed upwardly, the shoulder 26b is lifted, opening the valve and allowing air to escape downwardly through the valve.

Secured to top of casing 24 in any suitable fashion and in communication with the valve opening is a portion 27 of aero tubing which in practice will be part of a well known aero tubing fire alarm system.

Secured to and depending from top 11 are two hangers 28, between the lower ends of which is fastened a cross bar 29. A hollow stem 30 is threaded through a threaded opening in cross bar 29 and is locked in adjusted position by lock nut 31. Stem 30 is secured to the base of a Sylphon bellows 32 and is in communication with the interior of the bellows. An internally flanged nut 34 has its flange engaging the external flange of a cup-shaped member 35 and causes this external flange to compress a rubber gasket 36 against the lower end of stem 30. Gasket 36 surrounds and holds in place a small pencil or rod 37 of relatively porous carbon. The lower end of member 35 has a small opening 38 therein. It will therefore be understood that air in the bellows is in direct communication with the upper end of the carbon rod 37 via the bore of the hollow stem 30.

In the operation of this compensator unit, the housing 10 which may be seen in Fig. 6, it will be understood that the unit is included in an aero tubing fire alarm system and is positioned in close proximity to a blower heater 39 or other source of concentrated intermittent heat waves. In Fig. 6 the aero tubing fire alarm system includes a length of aero tubing 40 protecting an area including two rooms, in one of which is located the blower heater 39. The aero tubing 40 terminates in a detector unit 41, which includes means responsive to an increase in the air pressure within the tubing for operating a fire alarm control unit, sounding device, or transmitter. The detector unit 41 may be electrically connected, as via leads 42, to the means operated by it. Aero tubing fire alarm systems are, per se, well known, being shown, for example, in my Patent 2,537,185 granted January 9, 1951.

Under normal conditions the valve 26a, of which the stem 26 is shown, is in closed position so that air cannot leak from the tubing system therethrough. Bellows 32 is also in a condition in which the air therewithin is at the same pressure as the air pressure in the premises being protected. Let it be assumed that the blower heater begins directing heat rays or hot air into the protected premises, such heat or hot air opens the louver members 15 and comes into contact directly with the bellows 32. At the same time naturally a considerable part of the heat is reaching the aero tubing and if such heat continues for any appreciable length of time the air in the tubing becoming heated increases in pressure and would, unless relieved, actuate the alarm system. Since the bellows has a considerable surface to be heated, it follows that the air therewithin becomes heated more rapidly than that in the tubing with the consequence that the bellows expands and impinges the valve stem 26 opening this valve and permitting air to escape from the aero system. Thus, undesired increase in the air pressure in the system is effectively forestalled.

If the heat being supplied to the unit continues, the aero system leakage vent will take care of such a normal increase in air pressure as would occur, and it is then desirable that the valve associated with stem 26 be closed to prevent undue leakage. Such closure is accomplished through the adjacency of the carbon rod 37 which, as before mentioned, is of porous nature so that air can leak therethrough from the interior of the bellows until the bellows contracts to a position in which the pressure of air therewithin is in balance with the atmospheric pressure surrounding the bellows. The position of this rod 37 can be adjusted within the confines of the rubber ring 36 to cause more or less thereof to extend upwardly into the stem 30. Air from the interior of the bellows leaking through the carbon rod escapes from member 35 through the small vent opening 38. In this manner it is possible to equalize air pressure within the bellows with that in the surrounding atmosphere since it will be obvious that since a partial vacuum in the bellows by sudden cooling air will leak through the rod into the interior of the bellows. The unit, therefore, is self-restoring in operation and once the heat from the blower or other source has ceased, the system will rapidly assume normal conditions and be ready for a repetition of the described operation upon the next occurrence of heat supply, or despite the continuation of the heat supply, for which the aero tube system itself will have finally compensated when a heat balance has been reached in the protected area.

From the foregoing it will be seen that the present invention provides a novel compensator unit for aero tubing fire alarm systems, and the invention shall be limited only by the scope of the following claims.

What is claimed is:

1. A compensator unit for inclusion in a fire alarm system of a type including gas-filled tubing in the area to be protected and alarm-actuating means responsive to changes in the pressure of the gas within said tubing, said area including a source of intermittent concentrated heat, said compensator unit being positioned in the path of said intermittent concentrated heat and close to said source thereof, and comprising, a valve connected with and in communication with said tubing, said valve being normally closed so as to enable gas pressure within said tubing to increase in response to a rapid rise in temperature in said area, a housing adapted to allow heat from said source to enter it, and a member within said housing, outside said tubing, expansible when heated by said source and adapted to open said valve temporarily to enable gas to escape from said tubing to the atmosphere and thereby prevent a false alarm, said member being adapted to expand rapidly enough to open said valve before pressure within said tubing can increase sufficiently in response to heat from said source to cause a false alarm.

2. A compensator unit for inclusion in an aero tubing fire alarm system of a type including air-filled tubing and alarm-actuating means responsive to the pressure of the air in said tubing, said compensator unit being positioned in close proximity to a source of intermittent concentrated heat and comprising a valve connected to and in communication with said tubing, said valve being normally closed so as to enable air pressure within said tubing to increase in response to a temperature rise, a heat responsive member for opening said valve upon being subjected to said concentrated heat from said source, to permit air to escape from said tubing to the atmosphere, thereby reducing said pressure and preventing a false alarm, and means for restoring said heat responsive member to normal condition and said valve to a closed position after said member is subjected to said heat for a predetermined period, even if said member remains hot.

3. In an aero tubing fire alarm system of the type including tubing extending about the area to be protected, said tubing having air confined therein, and alarm-actuating means responsive to the pressure of said air in said tubing, said area including a source of intermittent concentrated heat adapted to affect the air pressure in said tubing, a compensator unit, comprising, in combination, a normally closed valve connected to and in communication with said tubing, a member expansible when heated to open said valve, said valve being adapted, when open, to relieve the air pressure in said tubing by allowing air to escape to the atmosphere, means for causing said expansible member to contract to normal conditions to close said valve after exposure to said heat for a predetermined length of time, and a housing around said compensator unit, said compensator unit being positioned in close proximity to said source of intermittent concentrated heat, whereby when heat is received by it solely from said source, said valve opens and prevents the pressure in said tubing from rising sufficiently to cause a false alarm.

4. In a fire alarm system for premises including an intermittently operating blower heater, in combination, a length of tubing filled with air, alarm-actuating means responsive to air pressure within said tubing, a normally closed valve connected to and in communication with said tubing, said valve being adapted when open to provide a pressure-releasing port for said tubing a valve-opening member, an air-filled bellows located close to and in the path of heat from said heater, said bellows being normally out of contact with said valve-opening member, said bellows being adapted when subjected to heat from said heater to expand and to contact said member to open said valve, thereby releasing the pressure within said tubing and preventing a false alarm, and venting means leading from the interior of said bellows to the atmosphere for permitting the heated air in said bellows to escape therefrom slowly to cause closing of said valve after the bellows has been subjected to said heat for a predetermined period.

5. A compensator unit for inclusion in an aero tubing fire alarm system and for positioning in close proximity to a non-hazardous source of intermittent concentrated heat comprising a housing having therein a normally closed valve connected to and in communication with said tubing, adapted to provide when open a pressure-relieving port for said tubing, an air-filled bellows member normally out of contact with said valve, said bellows member expanding and contacting said valve to open the same when subjected to concentrated heat from said source, thereby preventing a false alarm, and vent means for said bellows member having as part thereof a porous member through which air may pass slowly leading from the interior of said bellows member to the atmosphere, to relieve the air pressure within said bellows member after it has been heated for a predetermined time, so as to enable said bellows member to contract and close said valve.

6. A compensating rate-of-temperature rise transducer for connection to a compensating rate-of-rise pneumatic fire detection system, said transducer comprising an air-filled bellows expansible by an occurrence of concentrated heat from a non-hazardous heat source, means operable by expansion of said bellows for relieving the pressure in said fire detection system, thereby preventing a false alarm, and a porous carbon member in a wall of said bellows, providing a path through which air may leak slowly from the interior of said bellows to the atmosphere to enable it to contract.

7. In a pneumatic fire detection system for a region including an intermittently operating blower heater, in combination, a compensator housing, a length of tubing outside said housing having air confined within said tubing, alarm-actuating means responsive to increases in the pressure of air in said tubing, said housing normally enclosing a cavity within said housing on all sides and comprising swinging louver members on at least one side of said cavity, said housing being positioned in the immediate vicinity of said blower heater so that hot air from said blower heater may open said swinging louver members and enter said cavity, a valve connected with and in communication with said tubing, said valve being normally closed, and a heat responsive member within said housing for temporarily opening said valve in response to heat from said blower heater entering said housing, thereby temporarily relieving the air pressure within said tubing so as to prevent a false alarm when said blower heater turns on.

8. A compensator unit for inclusion in an aero tubing fire alarm system of a type including gas-filled tubing and alarm-actuating means responsive to the pressure of the gas in said tubing, said compensator unit being positioned in a room in close proximity to a source of intermittent concentrated heat entering said room and comprising, a valve connected to and in communication with said tubing, said valve being normally closed so as to enable gas pressure within said tubing to increase in response to a temperature rise, a valve-controlling member, and a heat responsive member outside said tubing adapted to actuate said valve-controlling member for opening said valve upon being subjected to the concentrated heat from said source, to enable gas to escape from said tubing to the atmosphere and thereby forestall a rise in the pressure within said tubing because of heat from said source, whereby to prevent a false alarm.

9. A compensator for inclusion in an aero tubing fire alarm system of a type including tubing extending about the area to be protected, said tubing having air therein, and alarm-actuating means responsive to the pressure of said air in said tubing, said compensator being positioned in close proximity to a source of intermittent concentrated heat and comprising a housing having therein a bellows member, a valve connected with and in communication with said tubing, said valve being normally closed so as to enable air pressure within said tubing to increase in response to a temperature rise and being adapted when opened to enable air to escape from said tubing to the atmosphere, a valve-actuating member, said bellows member being normally out of contact with said valve-actuating member but adapted to contact and actuate same to open said valve in response to the application to said bellows member of concentrated heat from said source, thereby preventing a rise in said air pressure within said tubing which would produce a false alarm in response to heat solely from said source.

References Cited in the file of this patent

UNITED STATES PATENTS

| | | |
|---|---|---|
| 1,919,129 | Reichel | July 18, 1933 |
| 2,100,184 | Cowan | Nov. 23, 1937 |
| 2,117,800 | Harrison et al. | May 17, 1938 |
| 2,168,244 | Rouse | Aug. 1, 1939 |
| 2,413,490 | Evans | Dec. 31, 1946 |
| 2,427,088 | Chapman | Sept. 9, 1947 |

OTHER REFERENCES

Continuous Tube Fire Detector, in "Aviation Week," page 25, May 1, 1950.